(12) United States Patent
Fujita et al.

(10) Patent No.: US 9,172,881 B2
(45) Date of Patent: Oct. 27, 2015

(54) CAMERA AND METHOD OF CONTROLLING OPERATION OF SAME

(71) Applicant: FUJIFILM CORPORATION, Tokyo (JP)

(72) Inventors: Koudai Fujita, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/582,900

(22) Filed: Dec. 24, 2014

(65) Prior Publication Data

US 2015/0109510 A1    Apr. 23, 2015

Related U.S. Application Data

(63) Continuation of application No. PCT/JP2013/064349, filed on May 23, 2013.

(30) Foreign Application Priority Data

Jun. 29, 2012  (JP) ................................. 2012-146945

(51) Int. Cl.
*H04N 5/232* (2006.01)
*G03B 17/02* (2006.01)
(Continued)

(52) U.S. Cl.
CPC ............ *H04N 5/23293* (2013.01); *G03B 13/10* (2013.01); *G03B 17/02* (2013.01);
(Continued)

(58) Field of Classification Search
CPC .......... H04N 5/23293; H04N 2101/00; H04N 5/232; H04N 1/2112; H04N 5/2251

USPC ....................................................... 348/333.01
See application file for complete search history.

(56) References Cited

U.S. PATENT DOCUMENTS 8,547,468 B2 * 10/2013 Churei .................... 348/333.06
2008/0267607 A1    10/2008 Mori
(Continued)

FOREIGN PATENT DOCUMENTS

| CN | 101296318 A | 10/2008 |
| CN | 101883213 A | 11/2010 |

(Continued)

OTHER PUBLICATIONS

International Search Report issued in PCT/JP2013/064349, mailed on Jul. 2, 2013.
(Continued)

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

It is arranged so that a user looking at an optical viewfinder and manipulating an operating member of a camera can ascertain which operating member is being manipulated. An optical image of a subject is displayed in the optical viewfinder. Operating members of the camera, which include a shutter-speed dial, exposure dial and command lever, are provided with respective touch sensors for sensing that these operating members have been touched. If the user touches the shutter-speed dial, an image representing the shutter-speed dial touched by the user appears on the optical image of the subject. Viewing the displayed image allows the user to ascertain that he is manipulating the shutter-speed dial.

12 Claims, 13 Drawing Sheets

(51) Int. Cl.
  *G03B 17/20* (2006.01)
  *H04N 5/225* (2006.01)
  *G03B 13/10* (2006.01)

(52) U.S. Cl.
  CPC .............. *G03B 17/20* (2013.01); *H04N 5/225* (2013.01); *H04N 5/2251* (2013.01); *H04N 5/23216* (2013.01); *H04N 5/23222* (2013.01)

(56) References Cited

U.S. PATENT DOCUMENTS

| | | | |
|---|---|---|---|
| 2010/0134676 A1* | 6/2010 | Miyanishi ................. | 348/333.01 |
| 2013/0083222 A1* | 4/2013 | Matsuzawa et al. ........ | 348/240.3 |
| 2013/0083228 A1* | 4/2013 | Iwatani .................... | 348/333.01 |

FOREIGN PATENT DOCUMENTS

| | | |
|---|---|---|
| JP | 2000-355256 A | 12/2000 |
| JP | 2001-160275 A | 6/2001 |
| JP | 2004-165934 A | 6/2004 |
| JP | 2004-170570 A | 6/2004 |
| JP | 2005-229145 A | 8/2005 |
| JP | 2006-033370 A | 2/2006 |
| JP | 2006-086840 A | 3/2006 |
| JP | 2010-187200 A | 8/2010 |
| JP | 2010-263425 A | 11/2010 |
| JP | 2012-85261 A | 4/2012 |
| JP | 2013-239785 A | 11/2013 |

OTHER PUBLICATIONS

Written Opinion issued in PCT/JP2013/064349, mailed on Jul. 2, 2013.
Japanese Office Action dated Feb. 10, 2015, for Japanese Application No. 2014-522488 with the English translation.
Japanese Office Action dated Jun. 2, 2015, issued in corresponding Japanese Patent Application No. 2014-522488.
Chinese Office Action dated Jun. 23, 2015, issued in corresponding Chinese Patent Application No. 201380034719.0.

* cited by examiner

CAMERA AND METHOD OF CONTROLLING OPERATION OF SAME

CROSS-REFERENCE TO RELATES APPLICATIONS

This application is a Continuation of POT International Application No. PCT JP2013/064349 filed on May 13, 2013, which claims priority under 35 U.S.C. §119(a) to Japanese Patent Application No. 2012-146945 filed Jun. 29, 2012. Each of the above application(s) is hereby expressly incorporated by reference, in its entirety, into the present application.

BACKGROUND OF THE INVENTION

1. Field of the Invention

This invention relates to a camera and to a method of controlling the operation thereof.

2. Description of the Related Art

When the user of a camera decides the angle of view, there are instances where the user looks at the optical viewfinder of the camera. The user brings an eye close to the optical viewfinder, observes the subject through the optical viewfinder and shoots the subject at the desired angle of view.

Further, there are cameras such as one that displays the image of a ring in an electronic viewfinder to give the sensation of using a ring operating member rotatably disposed on the outer periphery of a lens barrel (Patent Document 1), one that displays a mode menu bar in an electronic viewfinder in response to touching of an LCD (Patent Document 2), and one that display a mode dial image on a liquid crystal monitor (Patent Document 3).

Patent Document 1: Japanese Patent Application Laid-Open No. 2001-160275

Patent Document 2: Japanese Patent Application Laid-Open No. 2010-263425

Patent Document 3: Japanese Patent Application Laid-Open No. 2006-33370

When the eye of the user is brought near an optical viewfinder in order to decide angle of view, operating members provided on the camera case do not fall within the user's field of view. As a consequence, unless the user actually manipulates the operating member, the user cannot tell what the operating member being manipulated is nor what operation will be performed when the member is manipulated. For example, consider a camera having multiple dial operating members such as a mode dial and an up/down dial. When the user finds a dial by feel and tries turning the dial on such a camera, there are instances where the user realizes what operation he has been performed only after the mode display inside the optical viewfinder changes over or only after there is an increase or decrease in a corresponding numerical value such as the aperture or shutter speed. When the user operates such a camera while continuing to look into the optical viewfinder, operation of the camera is complicated and prone to error, and the user may miss a good photo opportunity by taking his eye from the optical viewfinder in order to check the dial he is manipulating.

In the cited Patent Documents 1 to 3, a ring or the like is displayed in an electronic viewfinder but no consideration is given to an arrangement that will allow the user to ascertain which operating dial or the like he is manipulating on a camera that offers the characterizing feature of an optical viewfinder, namely the ability to decide the angle of view while observing an attractive optical image of the subject.

SUMMARY OF THE INVENTION

An object of the present invention is to enable a user, who is looking at an optical viewfinder, to ascertain which operating member he is manipulating.

According to the present invention, there is provided a camera comprising: an optical viewfinder formed on the front of the camera and having an objective window facing a subject and an eyepiece window for looking at the subject seen through the objective window; an operating member provided on an external portion of the camera; a touch sensor for detecting that the operating member has been touched; a display unit for displaying an operating-member image, which represents the touched operating member, on a display screen in response to touching of the operating member sensed by the touch sensor; and a deflecting unit for introducing the operating-member image, which is displayed on the display screen of the display unit, to a position within a picture-taking zone of the eyepiece window.

The present invention also provides an operation control method suited to the above-described camera. Specifically, the present invention provides a method of controlling operation of a camera which includes an optical viewfinder formed on the front of the camera and having an objective window facing a subject and an eyepiece window for looking at the subject seen through the objective window, the method comprising steps of: a touch sensor detecting that an operating member, which is provided on an external portion of the camera, has been touched; a display unit displaying an operating-member image, which represents the touched operating member, on a display screen in response to touching of the operating member sensed by the touch sensor; and a deflecting unit introducing the operating-member image, which is displayed on the display screen of the display unit, to a position within a picture-taking zone of the eyepiece window.

In accordance with the present invention, the external portion of a camera is provided with an operating member. When the operating member is touched, an operating-member image representing the touched operating member is displayed on the display screen of a display unit. The operating-member image is introduced to a position within a picture-taking zone of an eyepiece window of an optical viewfinder. This enables the user to ascertain which operating member the user is touching while the user continues looking through the eyepiece window. In particular, the operating-member image representing the operating member being touched can be seen through the eyepiece window irrespective of the fact that the viewfinder is an optical viewfinder. This allows the user to ascertain the operating member being touched and to enjoy also the characterizing feature of an optical viewfinder, namely the fact that the user can decide the camera angle while also viewing an attractive image of the subject.

By way of example, the display unit, in response to touching of the operating member sensed by the touch sensor, displays, on the display screen, the operating-member image representing the touched operating member and an image indicating direction of operation of the touched operating member, and the deflecting unit introduces the operating-member image and the image indicating direction of operation, which are displayed on the display screen of the display unit, to a position within the picture-taking zone of the eyepiece window.

The display unit, in response to touching of the operating member sensed by the touch sensor, displays, on the display screen, an operating-member image representing an external appearance identical with that of the touched operating member.

By way of example, the display unit, in response to touching of the operating member sensed by the touch sensor, displays a name indicating the name or function of the touched operating member, and the deflecting unit introduces the name, which is displayed on the display screen of the display unit, to a position within the picture-taking zone of the eyepiece window.

By way of example, the display unit, in response to touching of the operating member sensed by the touch sensor, displays, on the display screen, the operating-member image representing the touched operating member and an image indicating status of the camera after operation of the touched operating member, and the deflecting unit introduces the operating-member image and the image indicating the status of the camera after operation of the operating member, which are displayed on the display screen of the display unit, to a position within the picture-taking zone of the eyepiece window.

When the operating-member image has been introduced to the position within the picture-taking zone of the eyepiece window by the deflecting unit, the display unit may display the operating-member image on the display screen so as to occupy a position corresponding to a position at which the operating member represented by the operating-member image is provided.

The display unit, in response to touching of the operating member, may display the operating-member image on the display screen in such a manner that the operating-member image representing the touched operating member appears on the display screen from a side thereof.

The display unit, in a case where the operating member is situated on the right side as viewed from the back of the camera, and in response to touching of the operating member, may display the operating-member image on the display screen in such a manner that the operating-member image representing the touched operating member appears on the display screen from the right side, and in a case where the operating member is situated on the left side as viewed from the back of the camera, and in response to touching of the operating member, may display the operating-member image on the display screen in such a manner that the operating-member image representing the touched operating member appears on the display screen from the left side.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
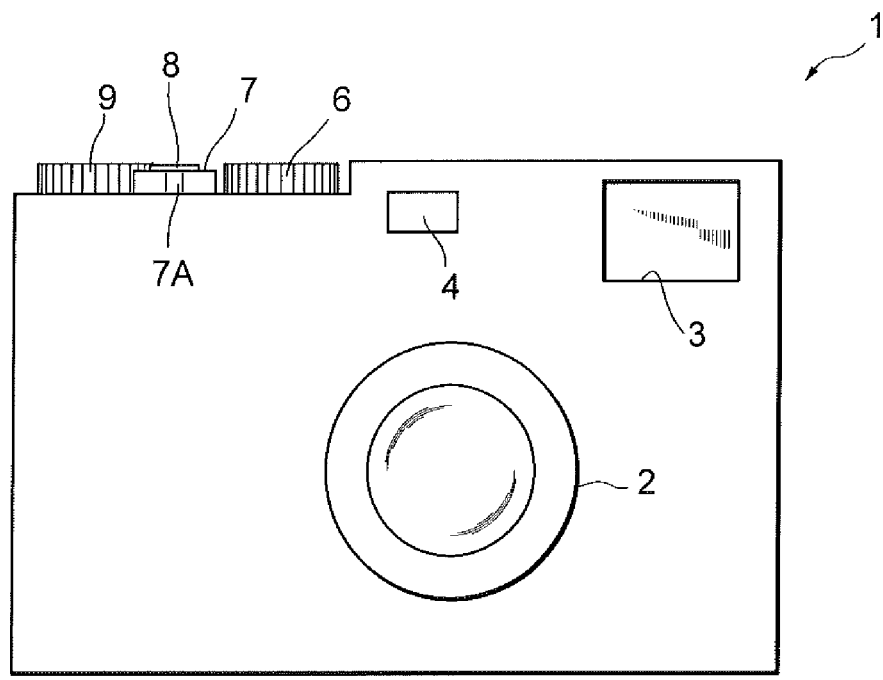
FIG. 1 is a front view of a digital camera.
Figure 2:
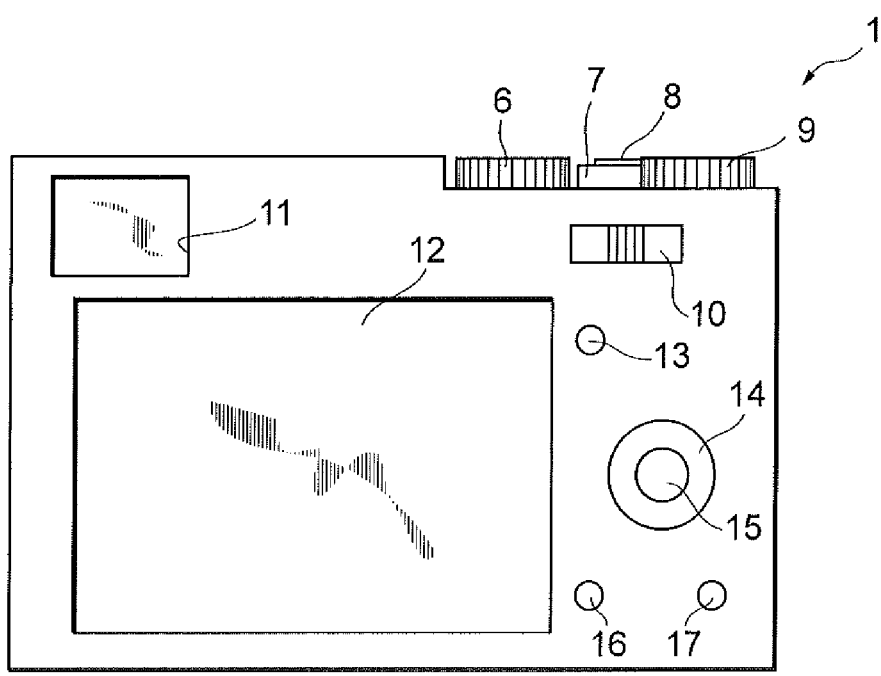
FIG. 2 is a back view of the digital camera.
Figure 3:
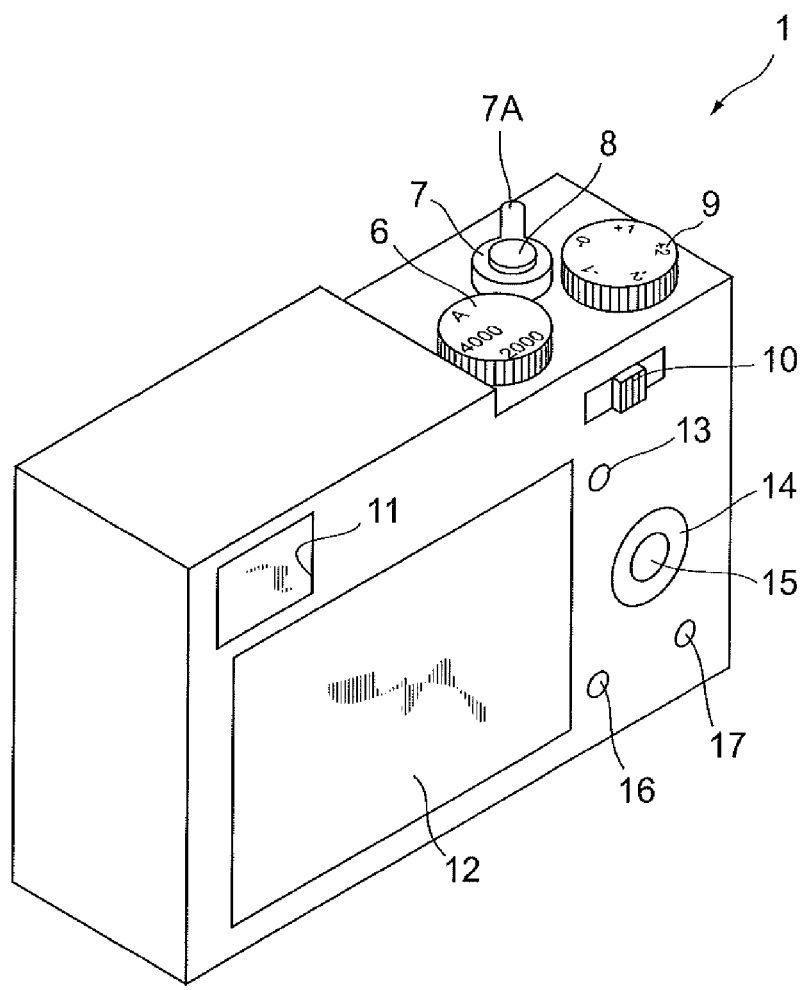
FIG. 3 is a perspective view of the digital camera when viewed from the back.

FIGS. 1 to 3, which illustrate an embodiment of the present invention, show the external appearance of a digital camera 1. FIG. 1 is a front view, FIG. 2 a back view and FIG. 3 a perspective view when viewed from the back.

With reference to FIG. 1, a lens barrel 2 projects forwardly from the approximate center of the front side of the digital camera 1. An optical viewfinder is constructed at the upper right of the digital camera 1 and is formed to include an objective window 3 facing a subject. A flash device 4 is provided on the left side of the objective window 3.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward when viewed from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure.

With reference to FIGS. 2 and 3, a liquid crystal display device 12 is provided on the back side of the digital camera 1 substantially over the entirety thereof. An eyepiece window 11 constituting the above-mentioned optical viewfinder is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AE (autoexposure) lock button 13, a command dial 14, a menu/OK button 15, a back button 16 and a RAW button 17, etc.

With reference primarily to FIG. 3, the shutter-speed dial 6, power lever 7, shutter-release button 8 and exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the optical viewfinder and looking at the eyepiece window 11, the user can view a subject through the objective window 3 and eyepiece window 11 and can decide the camera angle. In a case where the user decides the camera angle while looking through the eyepiece window 11, the user cannot directly see such operating members as the shutter-speed dial 6, power lever 7, shutter-release button 8 and exposure dial 9 provided on the case of the digital camera 1, and the user cannot ascertain the positions of these operating members. Consequently, in a case where the user manipulates a member such as the dial 6, the user relies upon intuition with regard to the position at which the member is located. It is difficult for the user to ascertain which member, such as the dial 6, he is manipulating. In this embodiment, it is arranged so that the user can tell which member, such as the dial, he is manipulating.

Figure 4:
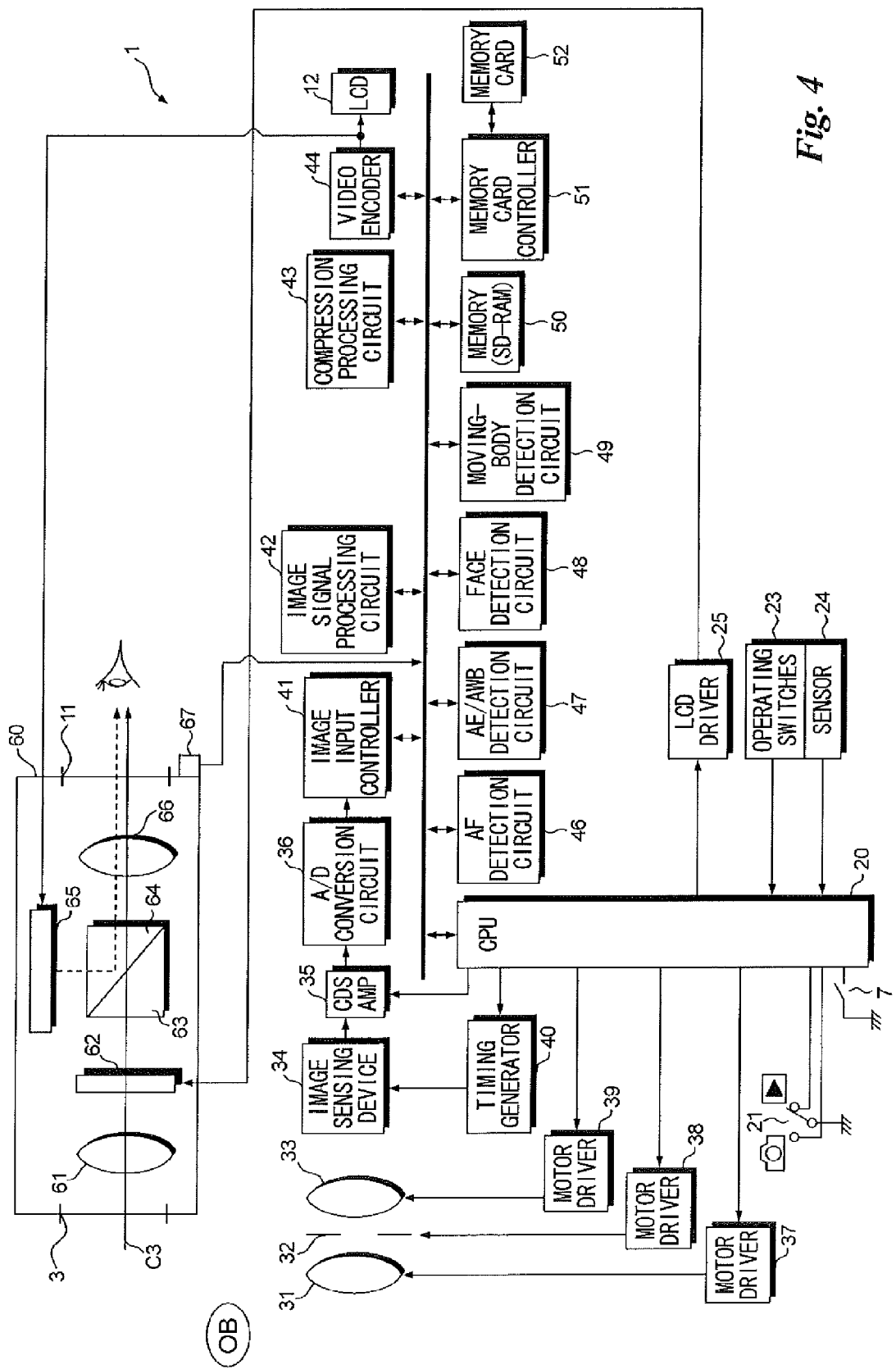
FIG. 4 is a block diagram illustrating the electrical configuration of the digital camera.

FIG. 4 is a block diagram illustrating the electrical configuration of the digital camera 1.

The overall operation of the digital camera 1 is controlled by a CPU 20.

As mentioned above, the digital camera 1 is provided with operating switches (operating members) 23 such as the shutter-speed dial 6, power lever 7 and exposure dial 9. Each of these operating switches 23 is formed to include a touch sensor 24 so that the user can ascertain whether the switch has been touched. Signals from the touch sensors 24 and from the operating switches 23 are input to the CPU 20. Further, a signal indicating whether the power supply has been turned on or off by the power lever 7 also is input to the CPU 20. Further, a changeover signal from a changeover switch 21 for switching between a shooting mode and a playback mode also is input to the CPU 20.

The digital camera 1 includes a solid-state electronic image sensing device 34. A zoom lens 31, iris 32 and focusing lens 33 are provided in front of the solid-state electronic image sensing device 34. The zoom lens 31 has its amount of zoom controlled by a motor driver 37, the iris 32 has its aperture value controlled by a motor driver 38, and the focusing lens 33 has its focus position controlled by a motor driver 39.

When the image of a subject is formed on the photoreceptor surface of the solid-state electronic image sensing device 34, the solid-state electronic image sensing device 34 is controlled by a timing generator 40 and a video signal representing the image of the subject is output from the solid-state electronic image sensing device 34. The video signal that has been output from the solid-state electronic image sensing device 34 is subjected to correlated double sampling in a CDS (Correlated Double Sampling) amplifier circuit 35. The CDS amplifier circuit 35 outputs the resultant video signal, which is converted to digital image data in an analog/digital conversion circuit 36.

The digital image data is input to an AF (autofocus) detection circuit 46 via an image input controller 41. A focusing control signal is generated based upon the entered digital image data, and the focusing control signal generated is input to the CPU 20. The motor driver 39 is controlled based upon the focusing control signal so that the focusing lens 33 is positioned. Further, the digital image data that has been output from the image input controller 41 is input to an AE (autoexposure)/AWB (automatic white balance) 47 as well. The AE/AWB detection circuit 47 generates an exposure control signal and a white balance adjustment signal. The exposure control signal generated is input to the CPU 20. The motor driver 38 is controlled based upon the exposure control signal, whereby the aperture value of the iris 32 is controlled. Further, the white balance adjustment signal generated in the AE/AWB detection circuit 47 is input to an image signal processing circuit 42. Image data that has been output from image input controller 41 also is input to the image signal processing circuit 42 as well. The image signal processing circuit 42 subjects the image data to a white balance adjustment based upon the white balance adjustment signal.

Image data that has been output from the image signal processing circuit 42 is applied to a liquid crystal display device 11 via a video encoder 44. The captured image of the subject is displayed on the display screen of the liquid crystal display device 11.

As mentioned above, the digital camera includes an optical viewfinder 60.

The optical viewfinder 60 has an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis L of the optical viewfinder 60. An OVF (optical viewfinder) shutter (which may be a mechanical shutter or a liquid crystal shutter) 62 and an objective lens 61 are provided in front of the prism 63. The optical viewfinder 60 is further provided with an electronic viewfinder 65. The electronic viewfinder 65 is a liquid crystal display device. Data representing various information and the like that are output from the video encoder 44 are input to the electronic viewfinder 65, where this information and the like are displayed. In this embodiment, an image such as that of the dial 6 touched by the user also is displayed in the electronic viewfinder 65, as will be described later in greater detail. Furthermore, by inputting image data, which has been obtained by imaging, to the electronic viewfinder 65 when the OVF shutter 62 has closed, the image of the subject obtained by imaging is displayed on the display screen of the electronic viewfinder 65.

When the OVF shutter 62 is open, the image of a subject OB formed by the objective lens 61 and eyepiece lens 66 can be seen through the eyepiece window 11. Further, when various information and images such as that of the dial 6 touched by the user are displayed on the display screen of the electronic viewfinder 65 when the OVF shutter 62 is open, light rays representing these items of information are reflected by the half-mirror 64 so that the user can see the information. Information and the like displayed on the display screen of the electronic viewfinder 65 can be seen upon being superimposed upon the optical image of the subject formed by the objective lens 61, etc.

An eye sensor 67 is mounted in the vicinity of the eyepiece window 11. The eye sensor 67 detects that the eye of user has been brought near the eyepiece window 11, whereupon the OVF shutter 62 opens so that the optical image of the subject OB can be viewed through the eyepiece window 11. If the eye sensor 67 has not detected that the eye of the user has been brought near the eyepiece window 11, the OVF shutter 62 closes. The image of the subject is displayed on the liquid crystal display device 12 and the user decides the camera angle while viewing the image of the subject being displayed on the liquid crystal display device 12. Even if the eye sensor 67 has detected that the eye of the user has been brought near the eyepiece window 11, the OVF shutter 62 can be turned off, image data representing the image of the subject can be input to the electronic viewfinder 65, and the image of the subject displayed in the electronic viewfinder 65 can be viewed through the eyepiece window 11.

The digital camera 1 further includes such circuits as a face detection circuit 48 and a moving-body detection circuit 49.

When the shutter-release button 8 is pressed, image data that has been output from the image signal processing circuit 42 as described above is stored temporarily in a memory 50. The image data is read out of the memory 50 and is input to a compression processing circuit 47, which proceeds to execute prescribed compression processing. The compressed image data is applied to and stored temporarily in the memory 50. The compressed image data is read out of the memory 50 and is recorded on a memory card 52 by a memory card controller 51.

When the playback mode is set, image data that has been recorded on the memory card 52 is read out and the image represented by the read image data is displayed on the display screen of the liquid crystal display device 12.

Furthermore, image data representing images such as an image of the dial 6 and data representing various information also have been stored in the memory 50, as described later. By reading out these items of data and applying them to the electronic viewfinder 65 via the video encoder 44, images such as an image of the dial 6 and various information are displayed on the display screen of the electronic viewfinder 65.

Figure 5:
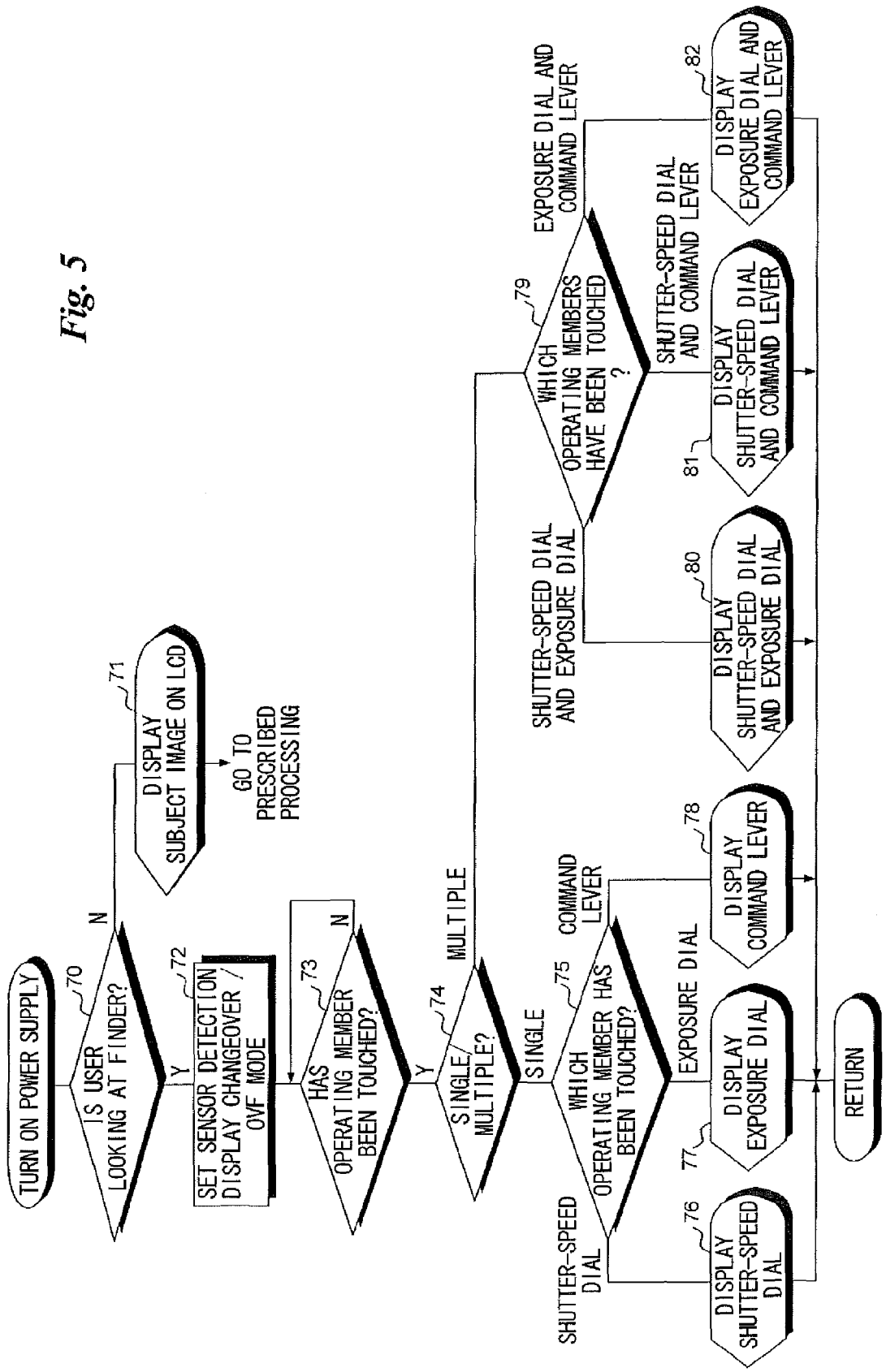
FIG. 5 is a flowchart illustrating processing executed by the digital camera.

FIG. 5 is a flowchart illustrating processing executed by the digital camera 1. It is assumed here that the camera has been set to the imaging mode.

When the power supply is turned on by the power lever 7 of the digital camera 1, whether the user is looking at the eyepiece window 11 of the optical viewfinder 60 is checked by the eye sensor 67, as described above (step 70). If the eye of the user cannot be sensed by the eye sensor 67 ("NO" at step 70), it is judged that the user is not looking at the eyepiece window 11 of optical viewfinder 60. Consequently, the image of the subject obtained by imaging is displayed on the liquid crystal display device 12 (step 71).

If the eye of the user is sensed by the eye sensor 67 and it is judged that the user is looking at the eyepiece window 11 of optical viewfinder 60 ("YES" at step 70), the camera is set to a sensor detection display changeover/OVF mode (step 72). The OVF shutter 62 opens and the user looking at the eyepiece window 11 can see the optical image of the subject.

Next, whether an operating member such as the dial 6 has been touched is determined by the touch sensor 24 (step 73). If the operating member has been touched ("YES" at step 73), then it is determined whether a single operating member has been touched or whether multiple operating members have been touched (step 74).

If a single operating member has been touched, then it is determined which operating member has been touched (step 75). If the shutter-speed dial 6 has been touched, then the image of the shutter-speed dial 6 is displayed in the electronic viewfinder 65 (step 76).

Figure 6:
FIG. 6 shows an example of the optical image of a subject and an example of an image displayed in an electronic viewfinder.
Figure 6:
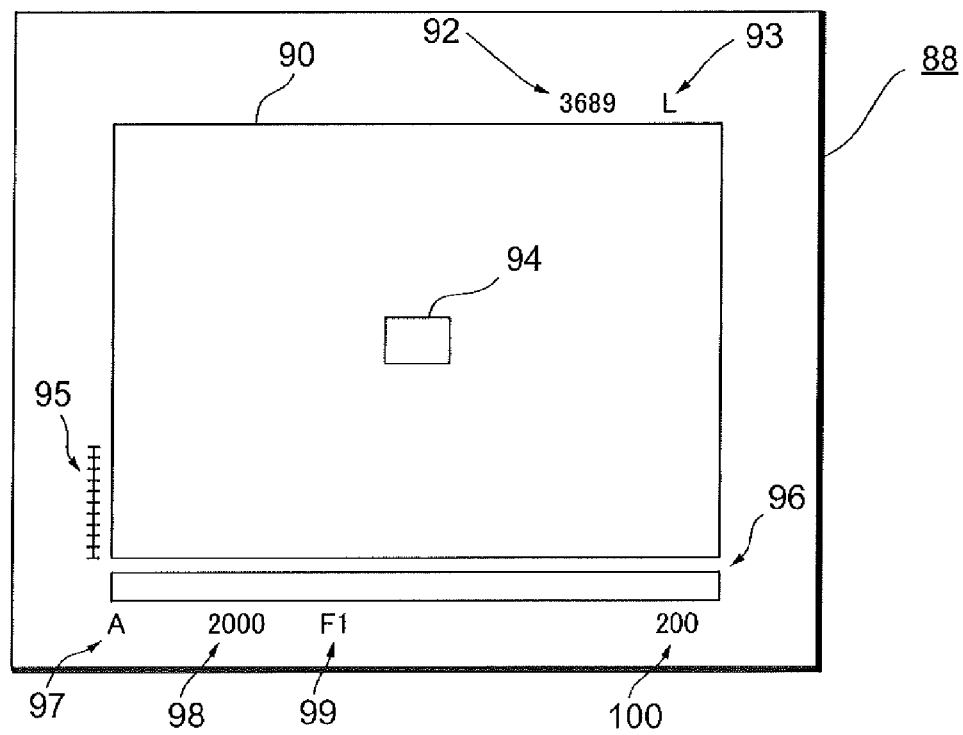

An example of an optical image 85 of a subject is shown at the top of FIG. 6.

When the eye of the user is brought near the eyepiece window 11 and the OVF shutter 62 opens, as mentioned above, the user sees the optical subject image 85 formed by the objective lens 61 and eyepiece lens 66.

An example of an image 88 displayed on the electronic viewfinder 65 is shown at the bottom of FIG. 6.

When the eye of the user is brought near the eyepiece window 11 and this is sensed by the eye sensor 67, the image 88 shown at the bottom of FIG. 6 is displayed on the display screen of the electronic viewfinder 65.

A visual-field frame 90 indicating a picture-taking zone is formed on the image 88. Numerals 92 indicating the number of photos that can be taken and a character 93 indicating image size are being displayed at the upper right of the visual-field frame 90. Further, an AF target mark 94 is being displayed at the center of the visual-field frame 90. An exposure correction bar 95 is being displayed at the lower left of the visual-field frame 90. Furthermore, a depth-of-field display bar 96, a character 97 indicative of exposure mode, shutter speed 98, aperture value 99 and ISO sensitivity 100 are being displayed below the visual-field frame 90.

Figure 7:
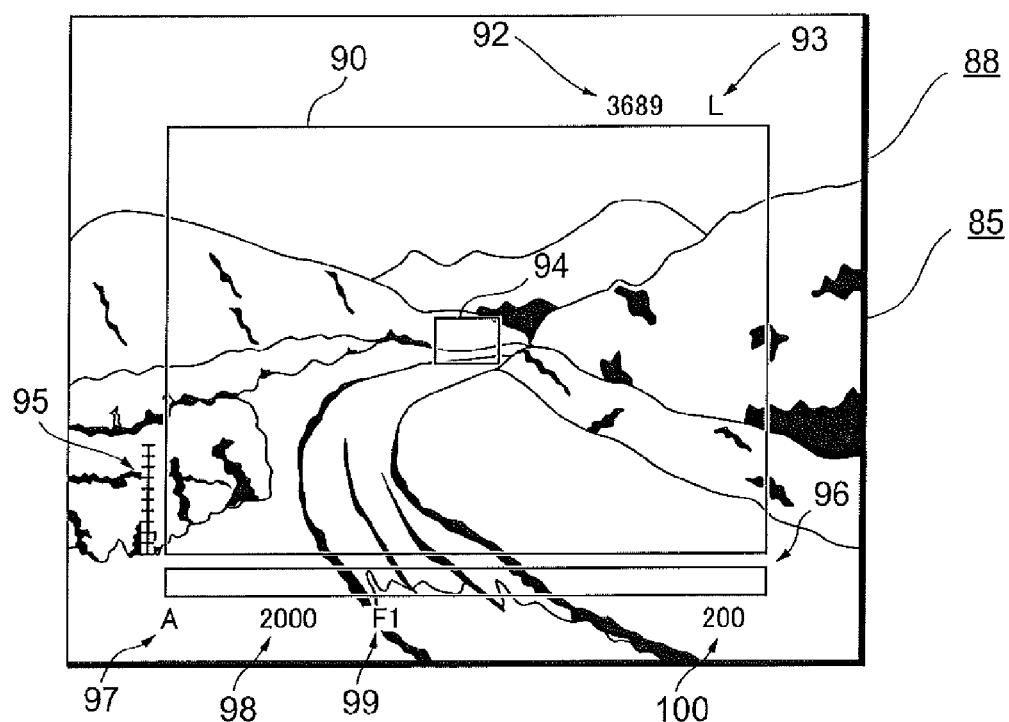
FIG. 7 is an example of an optical viewfinder as viewed by a user.

FIG. 7 illustrates an image that is the result of superimposing the image displayed on the electronic viewfinder 65, shown at the bottom of FIG. 6, on the optical image 85 shown at the top of FIG. 6.

Light rays representing information such as the visual-field frame 90 displayed on the electronic viewfinder 65 reach the eye of the user, who is looking at the eyepiece window 11, owing to the half-mirror 64. The user, therefore, can see an image that is the result of superimposing the information such as the visual-field frame 90, which is being displayed on the electronic viewfinder 65, onto the optical image 85 representing the image of the subject, as shown in FIG. 7.

Figure 8:
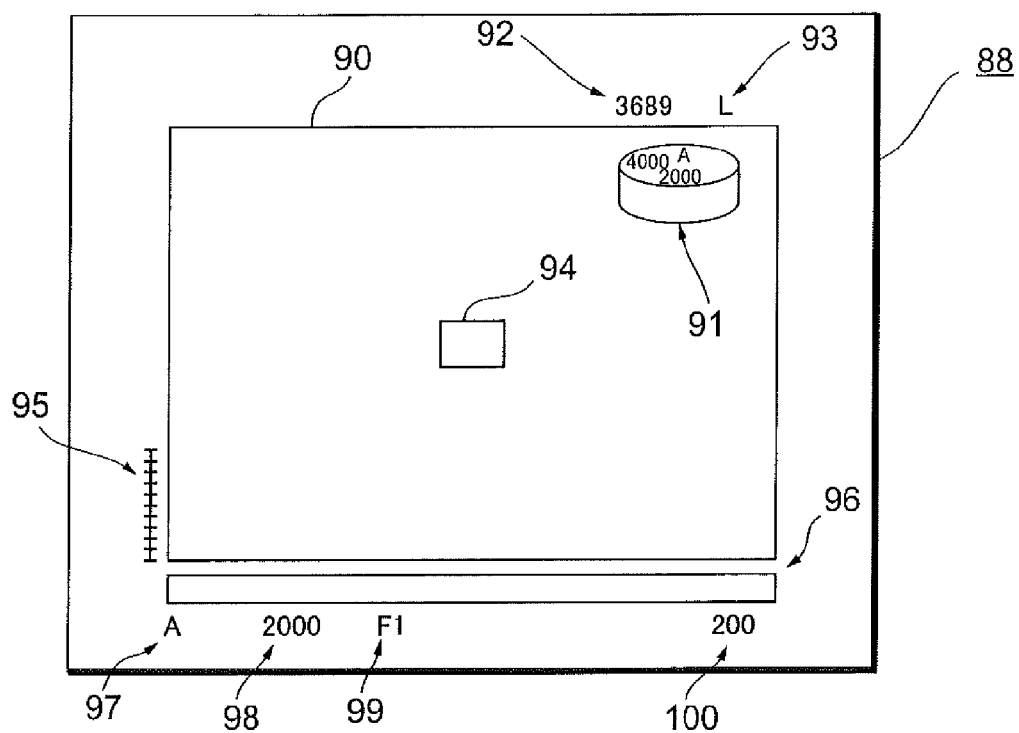
FIG. 8 is an example of an image displayed in the electronic viewfinder.

FIG. 8 is an example of the image 88 displayed in the electronic viewfinder 65 when the user has touched the dial 6, as described above.

Figure 9:
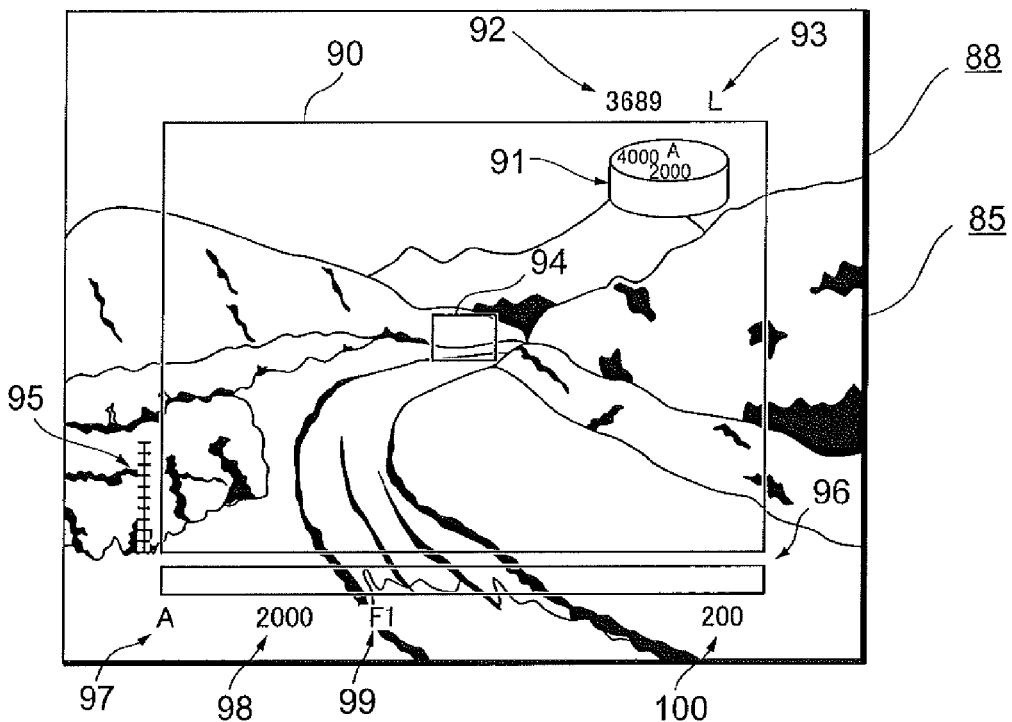
FIGS. 9 to 20 are images of optical viewfinders as viewed by a user.

When the fact that the shutter-speed dial 6 has been touched is sensed by the touch sensor 24, as described above, such information as the visual-field frame 90 appears on the display screen of the electronic viewfinder 65 and, in addition, an image 91, which indicates the external appearance of the shutter-speed dial 6, appears on the display screen of the electronic viewfinder 65 within the visual-field frame 90 at the upper right thereof. When this occurs, the user will see an image that is the result of superimposing the image of the shutter-speed dial 6 onto the optical image 85 of the subject, as shown in FIG. 9. Thus, without removing his eye from the eyepiece window 11, the user can tell that the member being manipulated is the shutter-speed dial 6.

When the user stops touching the shutter-speed dial 6, the image 91 vanishes.

With reference again to FIG. 5, in a case where a member other than the shutter-speed dial 6, namely the exposure dial 9 or command lever 10, is manipulated, an image representing the exposure dial 9 or command lever 10 is displayed within the visual-field frame 90 (steps 77, 78), as described above, and can be seen superimposed upon the optical image 85 of the subject.

In a case where multiple dials or the like are touched (step 74), which operating members are being touched is determined (step 79).

In a case where the shutter-speed dial 6 and exposure dial 9 are being touched, images of these dials 6 and 9 are displayed within the visual-field frame 90 (step 80). In a case where the shutter-speed dial 6 and command lever 10 are being touched, images of these dials 6 and 10 are displayed within the visual-field frame 90 (step 81). In a case where the exposure dial 9 and command lever 10 are being touched, images of these dials 9 and 10 are displayed within the visual-field frame 90 (step 82). It goes without saying that, in a case where the shutter-speed dial 6, command lever 10 and exposure dial 9 are all being touched, images of these members are displayed within the visual-field frame 90.

With regard also to operating members other than the shutter-speed dial 6, command lever 10 and exposure dial 9, it may be arranged so that images representing these dials and the like are displayed within the visual-field frame 90.

FIGS. 10 to 20 illustrate other embodiments. These correspond to FIG. 9 and illustrate the manner in which the image 80, which is displayed in the electronic viewfinder 65, is superimposed upon the optical image 85 of the subject. Items shown in these Figures identical with those shown in FIG. 9 are designated by like reference characters and need not be described again.

Figure 10:
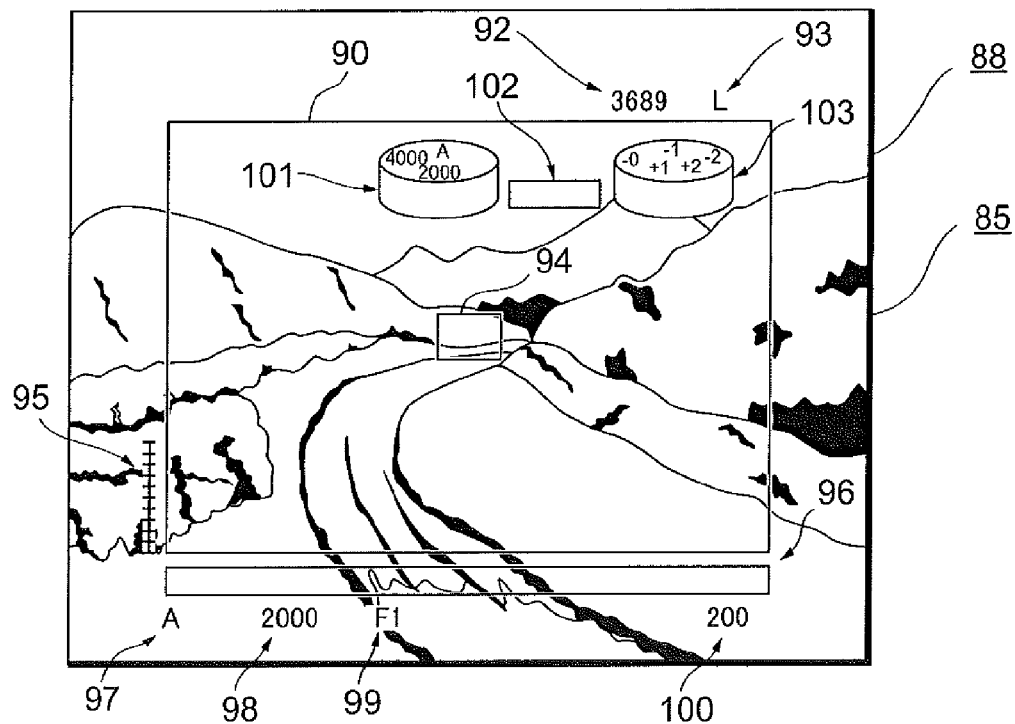

With reference to FIG. 10, an image 101 of the shutter-speed dial 6, an image 102 of the command lever 10 and an image 103 of the exposure dial 9 are being displayed within the visual-field frame 90 at the upper right thereof. The reason for this is that the shutter-speed dial 6, command lever 10 and exposure dial 9 have all been touched by the user.

Further, the positions at which the image 101 of shutter-speed dial 6, image 102 of command lever 10 and image 103 of exposure dial 9 are placed are the same as the positions at the actual shutter-speed dial 6, command lever 10 and exposure dial 9 are placed. Since the positions of placement of the image of the dial and the like displayed in the electronic viewfinder 65 are the same as the positions of placement of the actual dials and the like, the user can readily ascertain which operating members are being manipulated.

In the above-described embodiment, an operating member that the user is not touching does not have its image displayed. However, from among operating members the touching of which can be detected, the image of an operating member not being touched and the image of an operating member that is being touched may be displayed differently from each other, such as by using a chain line (or dotted line) to display the image of an operating member not being touched and using a solid line (or a flashing indication) to display the image of an operating member that is being touched. In the image shown in FIG. 10, for example, if the shutter-speed dial 6 is being touched but the command lever 10 and exposure dial 9 are not, then the image 101 would be displayed as a solid line and the images 102 and 103 would be displayed as chain lines. By viewing the images 101, 102 and 103, the user can ascertain what operating members are available and which one he is about to manipulate.

Figure 11:
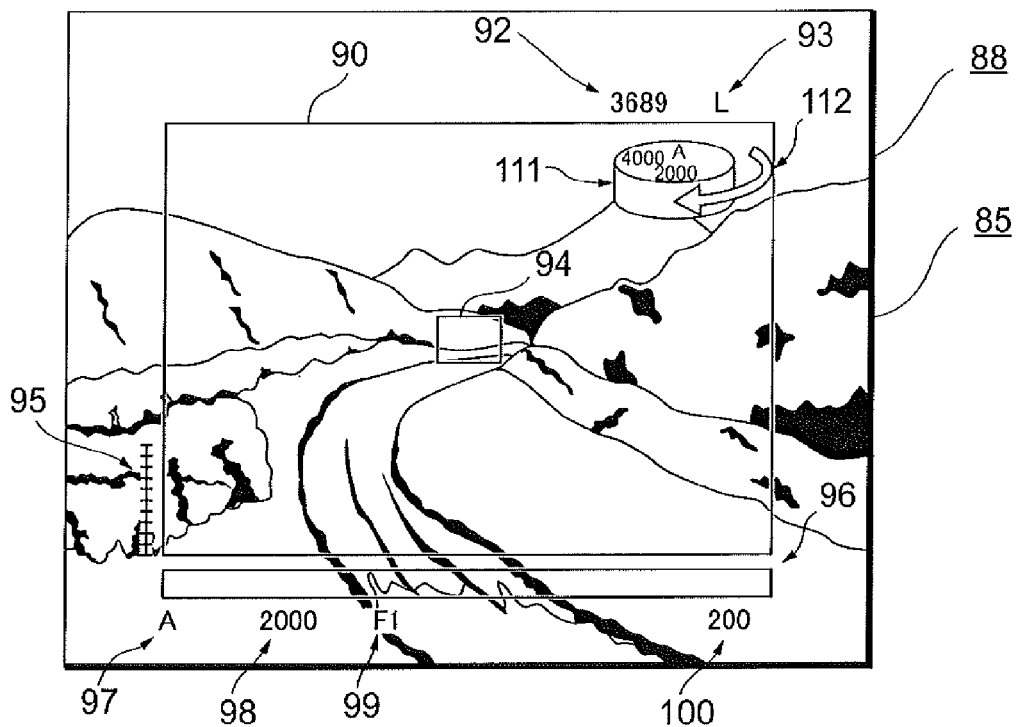

With reference to FIG. 11, an image 111 of the shutter-speed dial 6 and an image 112 of an arrow indicating the direction in which the shutter-speed dial 6 is being manipulated are being displayed within the visual-field frame 90 at the upper right thereof. Thus, it may be arranged to display an image indicating the direction in which an operating member such as the dial 6 is being manipulated.

Figure 12:
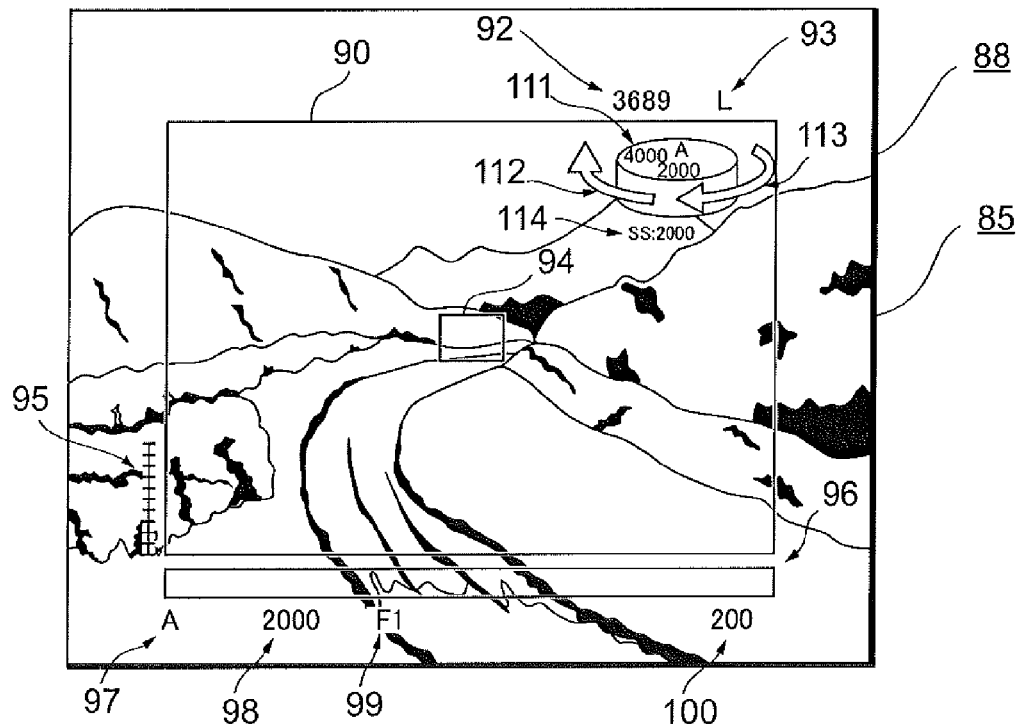

With reference to FIG. 12, in addition to the image 111 of the shutter-speed dial 6 and images 112 and 113 of two arrows indicating the direction in which the shutter-speed dial 6 is being manipulated, a numerical value 114 of shutter speed to which the shutter-speed dial 6 is currently set is also being displayed within the visual-field frame 90 at the upper right thereof. Since currently set shutter speed is also displayed within the visual-field frame 90, the user can ascertain the current shutter speed without shifting his line of sight. Preferably, information as to whether the shutter speed will be raised or lowered if the shutter-speed dial 6 is manipulated in one direction or the other is also displayed near the image 111.

Figure 13:
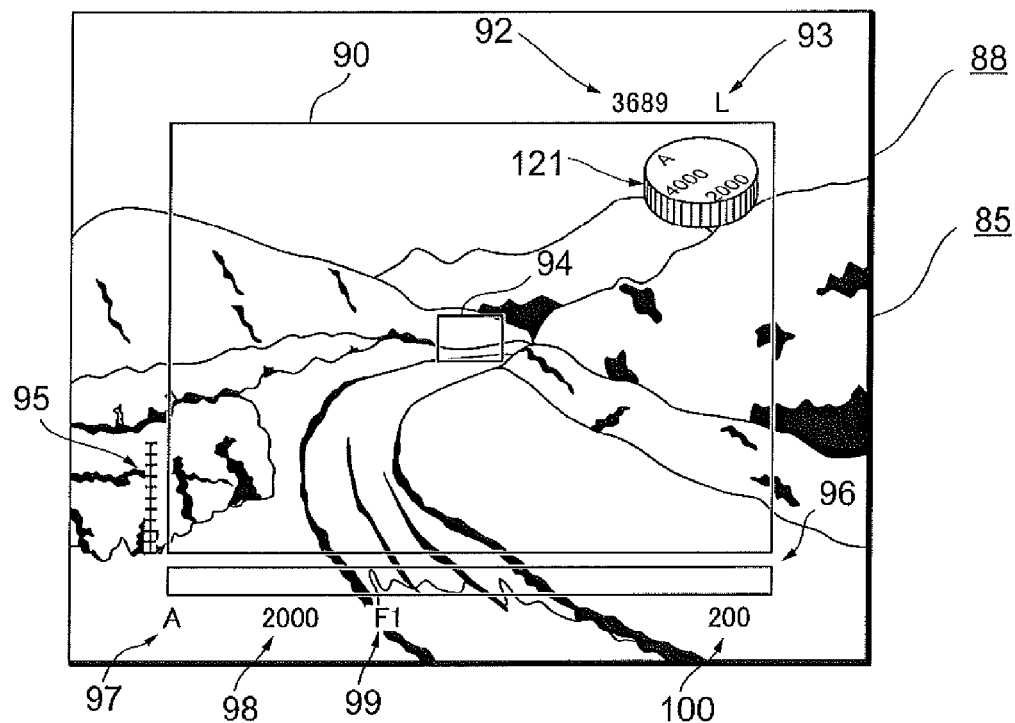

With reference to FIG. 13, an image 121 indicating the external appearance of the shutter-speed dial 6 is being displayed within the visual-field frame 90 at the upper right thereof. The image 121 is a perspective image presenting an external appearance identical with that of the shutter-speed dial 6. This allows the user to recognize at a glance that the shutter-speed dial 6 is being indicated. By observing the image 121, the user can immediately comprehend that the shutter-speed dial 6 is being manipulated. For example, the image 121 can utilize an image obtained by taking a picture of the dial 6.

Figure 14:
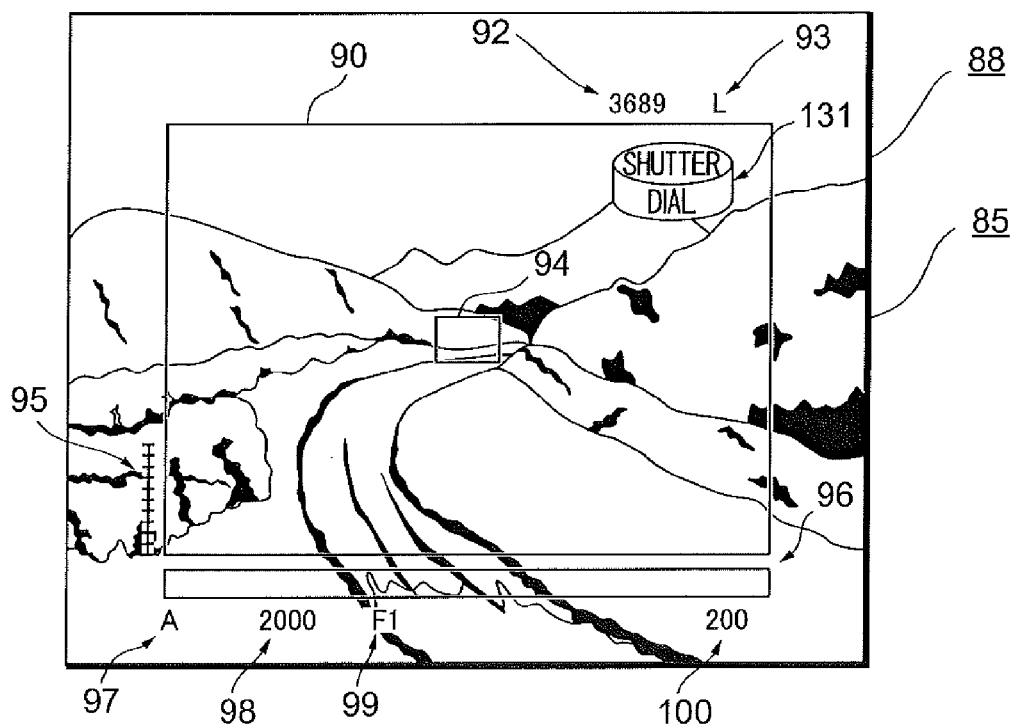

With reference to FIG. 14, an image 131 of the shutter-speed dial 6 is being displayed in the visual-field frame 90 at the upper right thereof. A character string reading "SHUTTER-SPEED DIAL" is being displayed on the image 131. By observing the image 131, the user can check that he is manipulating the shutter-speed dial 6. Naturally, rather than the character string indicative of the shutter-speed dial 6 being displayed, it may be arranged to display the function of the particular operating member, such as the fact that the shutter speed can be changed if the shutter-speed dial 6 now being touched is manipulated.

Figure 15:
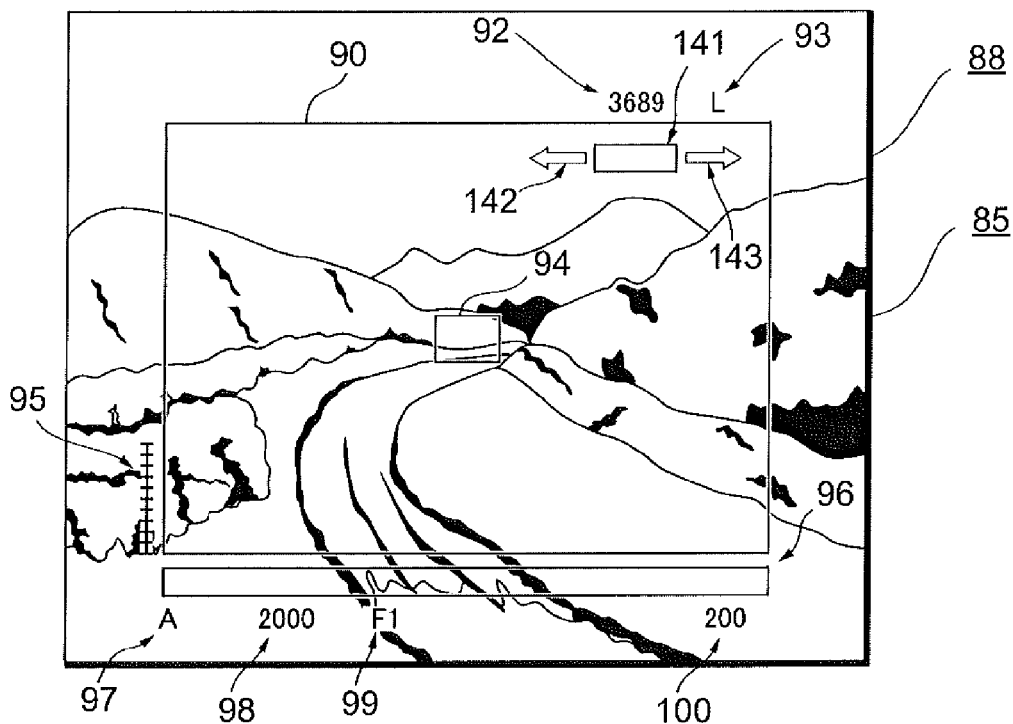

With reference to FIG. 15, an image 141 of the command lever 10 is being displayed in the visual-field frame 90 at the upper right thereof. An image 142 of a left-pointing arrow and an image 143 of a right-pointing arrow are being displayed on the left and right sides, respectively, of the image 141 representing the command lever 10. Since the command lever 10 can be moved to the right and left, the user, by observing the arrow images 142 and 143, can tell that the command lever 10 can be moved to the right and left. Thus, it may be arranged so that an image conforming to the method of manipulating the operating member is displayed.

Figure 16:
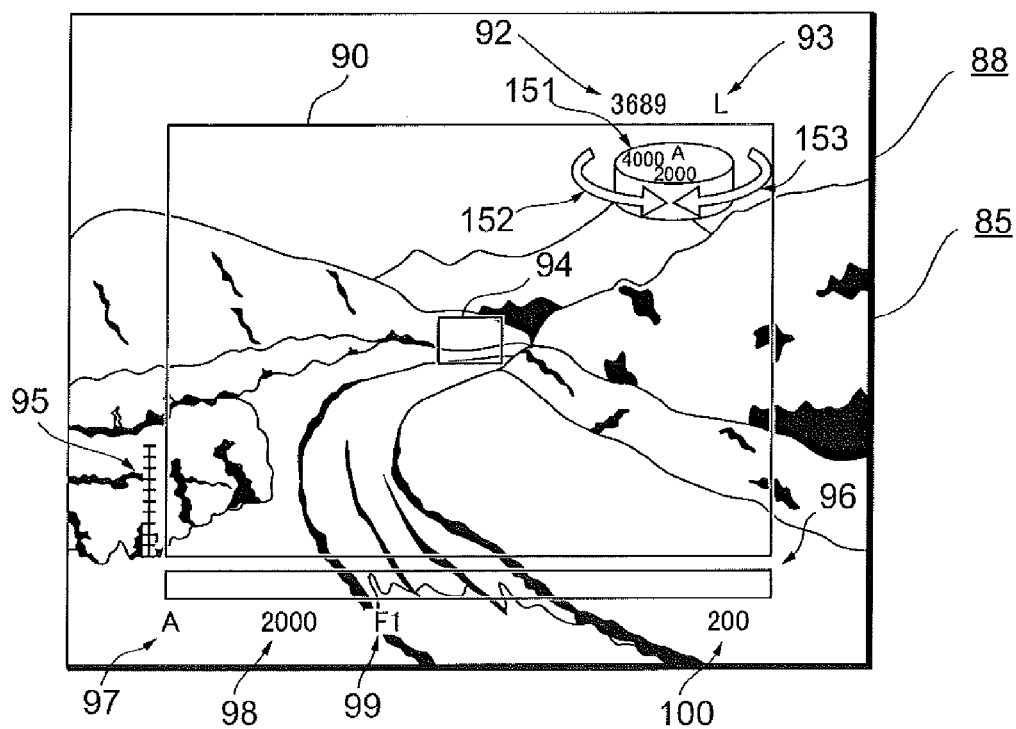

With reference to FIG. 16, an image 151 of the shutter-speed dial 6 is being displayed in the visual-field frame 90 at the upper right thereof. In addition, arrow images 152 and 153 are being displayed at the left and right, respectively, of the image 151. Displaying the arrow images 152 and 153 enables the user to ascertain that the shutter-speed dial 6 can be moved in the directions of the arrows.

Figure 17:
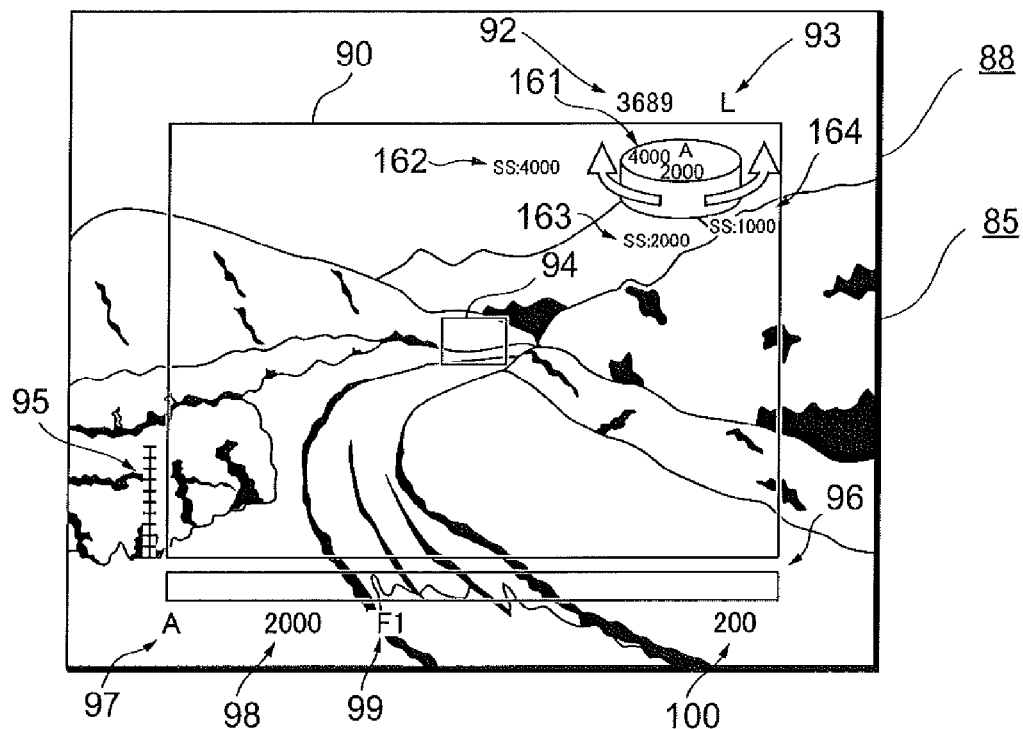

With reference to FIG. 17, an image 161 of the shutter-speed dial 6 is being displayed in the visual-field frame 90 at the upper right thereof. Further, an arrow indicating that the shutter-speed dial 6 is moved to the left and a numerical value 162 of shutter speed, which will be set by the dial 6 in a case where the dial 6 has been moved to the left, are being displayed on the left side of the image 161. A numerical value 163 of shutter speed that has been set by the dial 6 is being displayed below the image 161. Further, an arrow indicating that the shutter-speed dial 6 is moved to the right and a numerical value 164 of shutter speed, which will be set by the dial 6 in a case where the dial 6 has been moved to the right, are being displayed on the right side of the image 161. Thus the user can ascertain the shutter speed (the function of the digital camera 1) that will be in effect after the dial 6 is manipulated.

Figure 18:
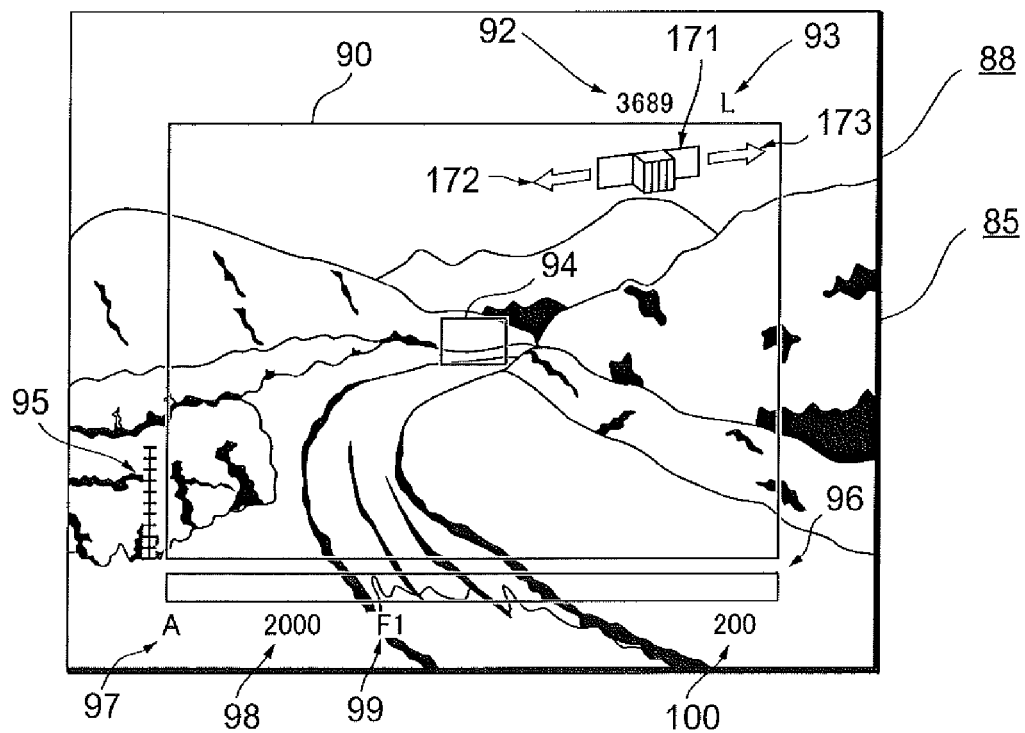

With reference to FIG. 18, an image 171 of the command lever 10 is being displayed three-dimensionally in the visual-field frame 90 at the upper right thereof. A left-pointing arrow 172 and a right-pointing arrow 173 are being displayed on the left and right sides, respectively, of the image 171. Displaying the operating member three-dimensionally allows the user to ascertain what operating member he is manipulating merely by looking at the image 171.

Figure 19:
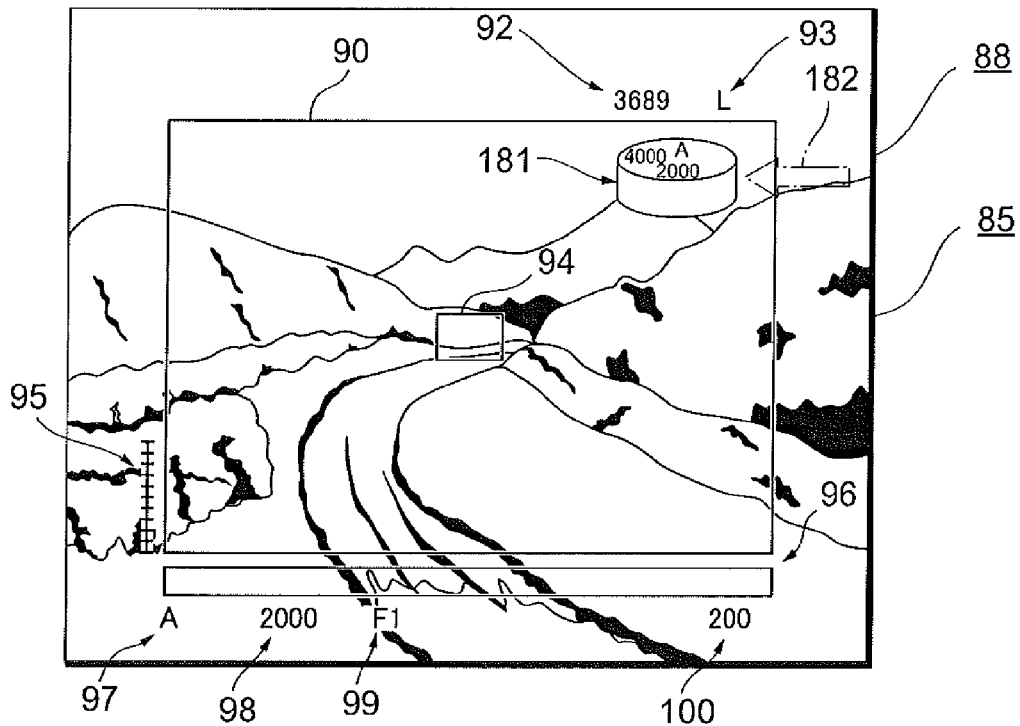

With reference to FIG. 19, when the shutter-speed dial 6 is touched, in a manner similar to that described above, an image 181 representing the dial 6 is displayed at the upper right so as to come into view within the visual-field frame 90 from the right side (transversely), as indicated by phantom-line arrow 182. Further, when the dial 6 stops being touched, the image 181 is moved toward the right side until it vanishes from view.

Figure 20:
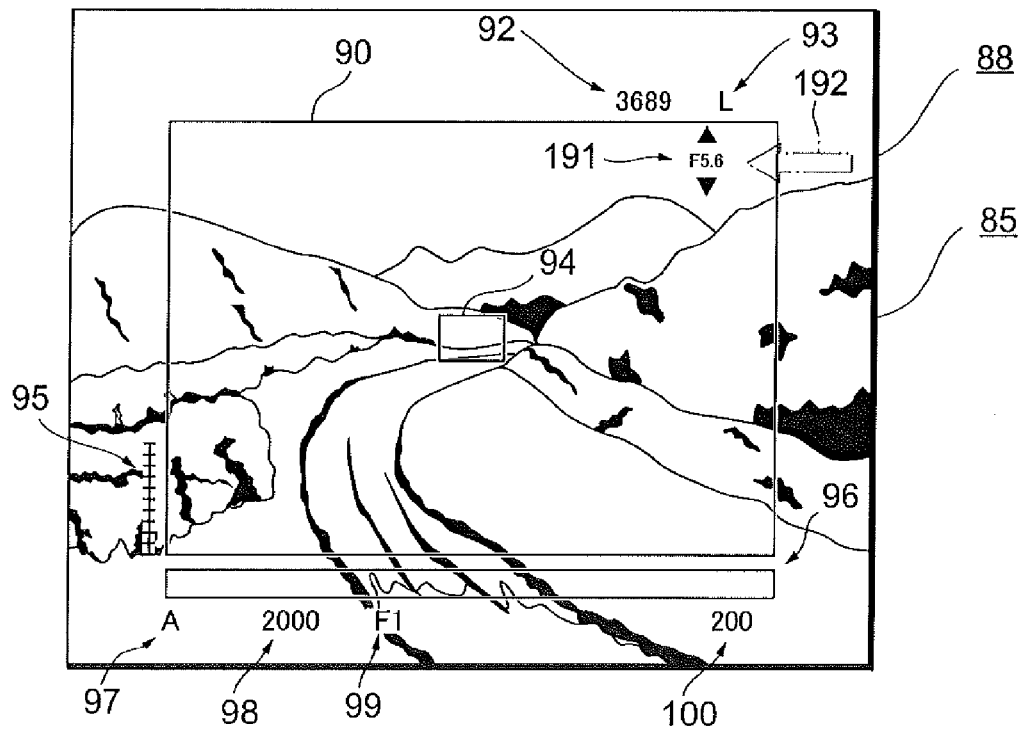

With reference to FIG. 20, when the exposure dial 9 is touched to correct the exposure, numerals 191 indicating exposure conforming to the amount of the correction are displayed at the upper right so as to come into view within the visual-field frame 90 from the right side, as indicated by phantom-line arrow 192. Thus, it may be arranged so that content set by an operating member is displayed within the visual-field frame 90.

Since the exposure dial 9 is provided on the right side of the digital camera 1 as seen from the back thereof, the image representing the exposure dial 9 comes into view from the right side. However, in a case where the image of a dial or the like that is provided on the left side of the digital camera 1 as seen from the back thereof is displayed, it may be arranged so that an image representing the dial or the like comes into view from the left side.

In the foregoing embodiments, an image or the like representing a touched operating member is displayed by touching the operating member, namely the shutter-speed dial 6, exposure dial 9 or command lever 10. However, it may be arranged so that operating members other than these are similarly displayed.

Further, in the foregoing embodiments, the image of an operating member is displayed in the electronic viewfinder 65 so that it can be viewed in a form superimposed upon the optical image of a subject. However, since the OVF shutter 62 is open, the image of the operating member can be rendered transparent so that the optical image can be seen through this image. This means that the image of the operating member will not interfere with the deciding of the camera angle. Naturally, by arranging it so that the portion of the optical image corresponding to the image of the operating member is masked, an arrangement may be adopted in which the image of the operating member is not rendered transparent. It goes without saying that the portion of the optical image corresponding to the image of the operating member can be masked by constructing the OVF shutter 62 using a liquid crystal shutter.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   an optical viewfinder formed on the front of the camera and having an objective window facing a subject, an eyepiece window for looking at the subject seen through the objective window, and an eye sensor detecting that the eye of a user is looking at the eyepiece window;
   an operating member provided on an external portion of the camera;
   a touch sensor for detecting that the operating member has been touched when the eye sensor detects that the eye of the user is looking at the eyepiece window;
   a display unit for displaying an operating-member image, which represents said touched operating member, on a display screen in response to touching of said operating member sensed by said touch sensor; and
   a deflecting unit for introducing the operating-member image, which is displayed on the display screen of said display unit, to a position within a picture-taking zone of the eyepiece window.

2. The camera according to claim 1, wherein in response to touching of said operating member sensed by said touch sensor, said display unit displays, on the display screen, the operating-member image representing said touched operating member and an image indicating direction of operation of said touched operating member; and
   said deflecting unit introduces the operating-member image and the image indicating direction of operation, which are displayed on the display screen of said display unit, to a position within the picture-taking zone of the eyepiece window.

3. The camera according to claim 1, wherein in response to touching of said operating member sensed by said touch sensor, said display unit displays, on the display screen, an operating-member image representing an external appearance identical with that of said touched operating member.

4. The camera according to claim 1, wherein in response to touching of said operating member sensed by said touch sensor, said display unit displays a name indicating the name or function of said touched operating member; and
   said deflecting unit introduces the name, which is displayed on the display screen of said display unit, to a position within the picture-taking zone of the eyepiece window.

5. The camera according to claim 1, wherein in response to touching of said operating member sensed by said touch sensor, said display unit displays, on the display screen, the operating-member image representing said touched operating member and an image indicating status of the camera after operation of said touched operating member; and
   said deflecting unit introduces the operating-member image and the image indicating the status of the camera after operation of the operating member, which are displayed on the display screen of said display unit, to a position within the picture-taking zone of the eyepiece window.

6. The camera according to of claim 1, wherein when the operating-member image has been introduced to the position within the picture-taking zone of the eyepiece window by said deflecting unit, said display unit displays the operating-member image on the display screen so as to occupy a position corresponding to a position at which the operating member represented by the operating-member image is provided.

7. The camera according to claim 1, wherein in response to touching of said operating member, said display unit displays the operating-member image on the display screen in such a manner that the operating-member image representing said touched operating member comes into view on the display screen from a side thereof.

8. The camera according to claim 1, wherein said display unit, in a case where said operating member is situated on the right side as viewed from the back of the camera, and in response to touching of said operating member, displays the operating-member image on the display screen in such a manner that the operating-member image representing said touched operating member comes into view on the display screen from the right side, and in a case where said operating member is situated on the left side as viewed from the back of the camera, and in response to touching of said operating member, displays the operating-member image on the display screen in such a manner that the operating-member image representing said touched operating member comes into view on the display screen from the left side.

9. A method of controlling operation of a camera which includes an optical viewfinder formed on the front of the camera and having an objective window facing a subject, an eyepiece window for looking at the subject seen through the objective window and an eye sensor detecting that the eye of a user is looking at the eyepiece window, said method comprising steps of:
   a touch sensor detecting that an operating member, which is provided on an external portion of the camera, has been touched when the eye sensor detects that the eye of the user is looking at the eyepiece window;
   a display unit displaying an operating-member image, which represents the touched operating member, on a display screen in response to touching of the operating member sensed by the touch sensor; and
   a deflecting unit introducing the operating-member image, which is displayed on the display screen of the display unit, to a position within a picture-taking zone of the eyepiece window.

10. The camera according to claim 1, wherein said display unit displays the operating-member image representing a plurality of operating member so that it become the same as the actual positions of placement of a plurality of touched operation member in response to detecting of touches of the plurality of operating member by said touch sensor.

11. The camera according to claim 1, wherein said display unit displays the operation-member image which is not touched and the operation-member image which is touched in a different status.

12. The camera according to claim 1, wherein said display device unit displays the contents set by the operation member to the display screen in response to detecting of touch of the operating member by said touch sensor.

* * * * *